United States Patent
Zhang et al.

(10) Patent No.: US 10,270,623 B1
(45) Date of Patent: Apr. 23, 2019

(54) SINGLE-CARRIER CHANNEL ESTIMATION METHOD

(71) Applicant: AMLOGIC (SHANGHAI) CO., LTD., Shanghai (CN)

(72) Inventors: Jinhong Zhang, Shanghai (CN); Jin Niu, Shanghai (CN); Xiaotong Liu, Shanghai (CN); Chun Wang, Shanghai (CN); Shixi Bu, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/560,139

(22) PCT Filed: Apr. 18, 2017

(86) PCT No.: PCT/CN2017/080944
§ 371 (c)(1),
(2) Date: Sep. 20, 2017

(87) PCT Pub. No.: WO2018/000914
PCT Pub. Date: Jan. 4, 2018

(30) Foreign Application Priority Data

Jul. 1, 2016 (CN) .......................... 2016 1 0507985

(51) Int. Cl.
*H04L 25/02* (2006.01)
*H04B 17/336* (2015.01)
*H04L 5/00* (2006.01)
*H04L 25/03* (2006.01)

(52) U.S. Cl.
CPC ....... *H04L 25/0214* (2013.01); *H04B 17/336* (2015.01); *H04L 5/0048* (2013.01); *H04L 25/03159* (2013.01)

(58) Field of Classification Search
CPC .................. H04L 25/03019; H04L 25/03057
USPC ......................................................... 375/232
See application file for complete search history.

(56) References Cited

U.S. PATENT DOCUMENTS

2014/0294055 A1* 10/2014 Pustovalov ......... H04L 25/0236
375/232

* cited by examiner

*Primary Examiner* — Kevin Kim
(74) *Attorney, Agent, or Firm* — SoCal IP Law Group LLP; Mark Andrew Goldstein

(57) ABSTRACT

The invention relates to the field of channel coding and modulation technique, more specifically, to a single-carrier channel estimation method, comprising: equalizing a carrier of an input current-frame signal and of a channel of the current-frame signal, to obtain a sequence code of the current-frame signal, decision value of transmission sequence of the current-frame signal and estimated value of signal-to-noise ratio of the current-frame signal; calculating the current-frame signal, the sequence code and the estimated value of signal-to-noise ratio to obtain a initial channel estimation; calculating the current-frame signal, the decision value of transmission sequence and the estimated value of signal-to-noise ratio to obtain a reference channel; obtaining a filtered channel value after filtering the reference channel; and obtaining the estimated channel of the next-frame signal after implementing adaptive filtering on the estimated value of initial channel and filtered channel value, by reference to the reference channel.

10 Claims, 3 Drawing Sheets

SINGLE-CARRIER CHANNEL ESTIMATION METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/CN/2017/080944, filed Apr. 18, 2017 entitled, "SINGLE-CARRIER CHANNEL ESTIMATION METHOD", which claims priority to Chinese Application No. 201610507985.6, filed Jul. 1, 2016 entitled, "SINGLE-CARRIER CHANNEL ESTIMATION METHOD, all of which are incorporated herein by reference in their entirety.

BACKGROUND

Field

The invention relates to the field of channel coding and modulation technique, more specifically, to a single-carrier channel estimation method.

Description of the Related Art

In the field of channel coding and modulation technique, the channel estimation method is that, the input signal passes through a correlator or through frequency-domain division to obtain the initial channel estimation; then the initial channel estimation of multiple frames is filtered by a fixed coefficient filter to obtain a channel estimation; or alpha filtering method is used for a reconstructed channel, so as to obtain a channel estimation.

However, in the prior art, the initial channel estimation obtained by the above mentioned channel estimation methods has a poor performance. Due to the fixed coefficient filtering, it cannot obtain the best channel estimation, since the channel property is unknown. The bandwidth of the filter is determined by Doppler, which is unknown, thus resulting in the estimated best channel has a poor performance.

SUMMARY OF THE INVENTION

For the deficiencies of the prior art, the present invention provides a channel estimation method capable of: obtaining preferable past initial channel estimation through channel reconstruction; obtaining future initial channel estimation through correlator or frequency-domain division; and obtaining the best channel estimation by implementing the adaptive filtering.

The main technical scheme to solve the above-mentioned technical problems is:

a single-carrier channel estimation method comprising:

equalizing a carrier of an input current-frame signal and of a channel of the current-frame signal, to obtain a sequence code of the current-frame signal, a decision value of a transmission sequence of the current-frame signal and an estimated value of a signal-to-noise ratio of the current-frame signal; and calculating the current-frame signal, the sequence code and the estimated value of the signal-to-noise ratio to obtain an estimated value of an initial channel;

calculating the current-frame signal, the decision value of the transmission sequence and the estimated value of the signal-to-noise ratio to obtain a reference channel;

filtering the reference channel to obtain a filtered channel value; and adaptive-filtering the estimated value of the initial channel and the filtered channel value, by taking the reference channel as a reference value, to obtain an estimated channel value of a next-frame signal.

Preferably, in the above channel estimation method, the carrier of the current-frame signal and of the channel of the current-frame signal is equalized by using a single-carrier equalizer.

Preferably, in the above channel estimation method, the estimated value of the initial channel is the frequency response of the channel, which is obtained by calculating the current-frame signal, the sequence code and the estimated value of signal-to-noise ratio through time-domain correlation algorithm or frequency-domain division.

Preferably, in the above channel estimation method, the time-domain correlation algorithm comprises linear correlation algorithm or circular correlation algorithm.

Preferably, in the above channel estimation method, the decision value of the transmission sequence comprises a sequence code and the estimated value of a signal-to-noise ratio.

Preferably, in the above channel estimation method, the reference channel is the frequency response of the channel, the filtered channel value is obtained by filtering the reference channel by a filter, and a bandwidth of the filter equals to the length of the sequence code.

Preferably, in the above channel estimation method, the filtered channel value is obtained by filtering the reference channel by Fourier transform method.

Preferably, in the above channel estimation method, wherein the adaptive filtering comprises:

filtering the estimated value of the initial channel and the filtered channel value by taking the reference channel as a reference value, to generate the sub-band filter;

updating a coefficient of the sub-band filter, so as to generate a latest estimated value of the initial channel and a latest filtered channel value; and calculating the latest estimated value of the initial channel and the latest filtered channel value, to generate the estimated channel value of the next-frame signal.

Preferably, in the above channel estimation method, the current-frame signal is a time-domain signal, and the time-domain signal is a baseband signal, and the baseband signal is converted from a signal being implemented analog-to-digital conversion, then frequency conversion, filtering, and sampling rate conversion; and rate of the baseband signal is a single symbol rate.

Preferably, in the above channel estimation method, each frame of signal comprises a sequence code and a single-carrier data connected to a tail of the sequence code, and the sequence codes of each frame of signal are identical wherein, so as to form a circular correlation.

The advantages or beneficial effects of the above technical solutions are:

The present invention provides a single-carrier channel estimation method which obtains the sequence code, the signal-to-noise ratio of the current-frame signal, a reference channel H_ref, and a filtered channel value H_better (i.e., the better channel estimated value, hereinafter H_better is referred to as the better channel estimated value), by equalizing the channel estimation and the input current-frame signal; obtaining the initial channel estimation H_init through the correlator; and by taking the current H_ref as a reference value, implementing adaptive channel estimation on the initial channel estimation H_init and the filtered channel H_better, and updating the coefficient, so as to obtain the next-frame channel estimation. The technical solution of the invention realizes calculating the best channel estimation in any kind of channel environment (whether it is still or moving at different speed), so as to improve the performance of receiver.

Figure 1:
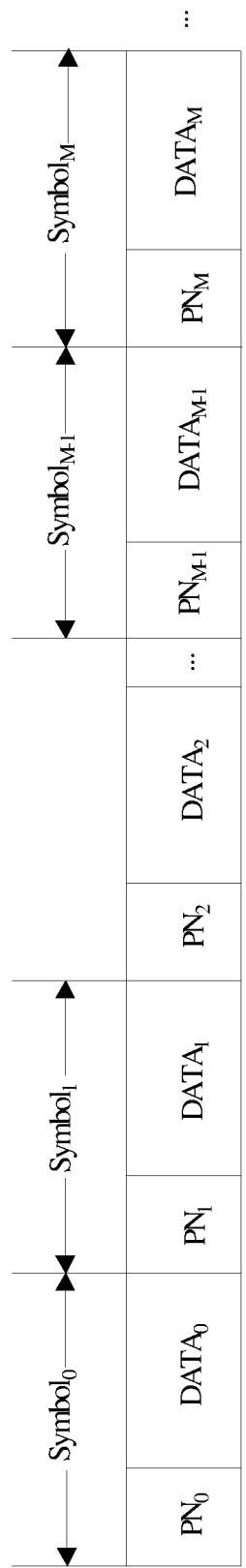
FIG. 1 is a frame structure of a DTMB (Digital Terrestrial Multimedia Broadcast) system of the present invention.

The accompanying drawings, together with the specification, illustrate exemplary embodiments of the present disclosure, and, together with the description, serve to explain the principles of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

It should be noted that, in the absence of conflict, the following technical solutions, technical characteristics can be combined with each other.

The present invention will be described in further detail with reference to the accompanying drawings.

In the single-carrier channel estimation method of the present invention, equalizing a carrier of the input current-frame signal eqin and of the channel H_flt of the input current-frame signal eqin, so as to obtain the pn code of eqin, transmitting the sequence decision value slicer_out, and the signal-noise ratio estimated value snr_esti; then calculating to obtain the estimated value of the initial channel H_init according to eqin, pn and snr_esti; then calculating to obtain the reference channel H_ref according to eqin, slicer_out and snr_esti; filtering the reference channel H_ref, so as to obtain the filtered channel value H_better; and by taking current H_ref as a reference value, implementing adaptive channel estimation on the initial channel estimation H_init and the filtered channel value H_better and updating the coefficient, so as to obtain the next-frame channel estimated value.

The single-carrier channel estimation method of the present invention will be described in detail with reference to specific embodiments and the accompanying drawings.

As shown in FIG. 1, the frame structure of a DTMB (frame structure of Digital Terrestrial Multimedia Broadcast transmitting system, Channel Coding and Modulation) system of the present invention, each frame of signal (hereinafter referred to as Symbol) of the embodiment includes a frame header and a frame body, and the frame header may be a PN sequence (hereinafter referred to as PN), and the frame body may be a data block (hereinafter referred to as DATA). The connecting method between each frame of signal is that: the DATA of the previous-frame signal is connected to the PN of the next-frame signal. For example, as shown in FIG. 1, the DATA® of the previous-frame signal Symbol$_0$ is connected to the PN$_1$ of the next-frame signal Symbol$_1$, the DATA$_{M-1}$ of the previous-frame signal Symbol$_{M-1}$ is connected to the PN$_M$ of the next-frame signal Symbol$_M$, and so on, which does not need to be repeated here.

There are three possibilities for the PN sequence of the embodiment, which are PN420, PN595 and PN945 respectively, and the corresponding length of the PN sequence is 420, 595 and 945 respectively. The PN of each Symbol may be invariant or variant. The embodiment only describes the situation in which the PN is invariant.

The DATA of this embodiment has two possibilities, which correspond to single carrier and multi carrier respectively, the length thereof is 3780. If DATA is single carrier, the PNs in each Symbol are consistent, and they constitute circular correlation. In this invention, all the operational lengths fftlen of the FFT and IFFT (Fourier transform and Fourier inversion) are the length of PN+3780 (length of PN plus 3780).

Figure 2:
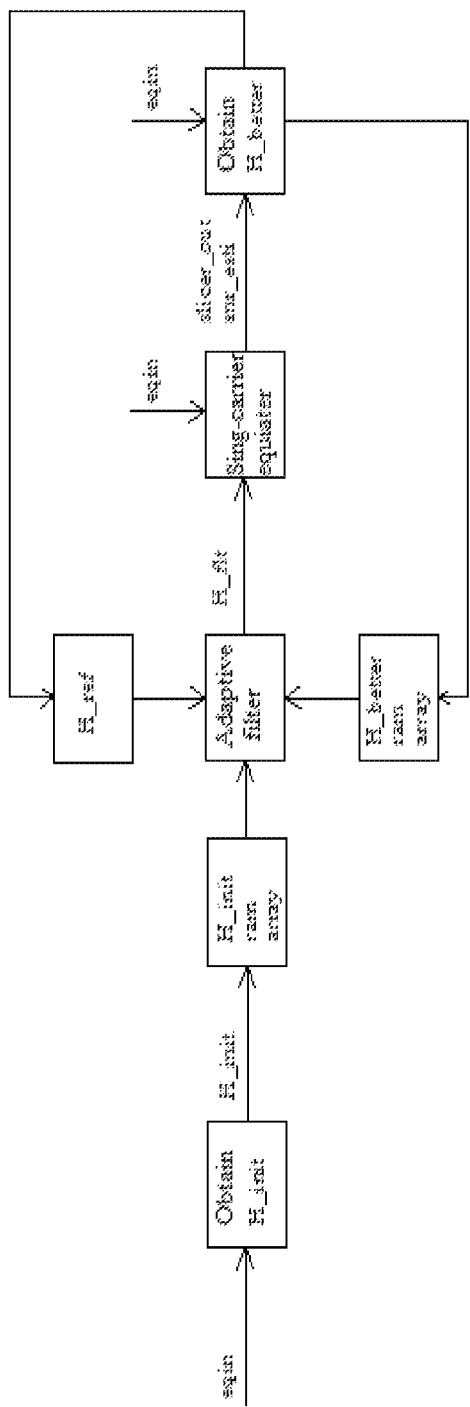
FIG. 2 is a channel estimation and equalization of the single-carrier of the present invention.

FIG. 2 is the channel estimation of the single-carrier, divided into four parts, 1. The acquisition of estimated value of the initial channel (H_init); 2. The acquisition of reference channel (H_ref); 3. Acquisition of the estimated value of better channel (H_better); 4. Adaptive filtering.

The single-carrier equalizer in FIG. 2 can select an arbitrary method through the known current-frame signal (eqin) and the channel estimation (H_flt) of eqin to equalize, so as to obtain the decision value of transmission sequence (slicer_out, the decision value contains the sequence code (pn) and the estimation of the transmission sequence) and the estimation of SNR (Signal-to-Noise Ratio) of the current-frame signal eqin (snr_esti). Wherein, eqin is a time-domain signal implemented with an analog-to-digital conversion (ADC), and is converted into a baseband signal after implemented with down-conversion, filtering, and sampling rate conversion. The signal rate is a single symbol rate. In the DTMB system, the rate is 7.56 MHz.

The above four parts will be described in detail afterwards.

1. The Acquisition of Estimated Value of the Initial Channel (H_Init)

H_init is an input to the channel estimation, which is the frequency-domain response of the channel and can be obtained by time-domain correlation (including linear correlation, or circular correlation), or by frequency-domain division.

1.1 Time-Domain Correlation

For a single symbol, the length of H_init is fftlen. Take circular correlation as an example, $$h1[n] = \sum_{ck0=0}^{corrlen-1} \frac{eqin[\mathrm{mod}(ck0+n, corrlen) + gdlen] * pn[ck0 + gdlen]}{corrlen * 2 * pnAMP}$$
$$0 \le n < \mathrm{h\_len}$$

$$hcir[n] = \begin{cases} h1[n] & h < \mathrm{h\_len} \\ 0 & \mathrm{h\_len} \le n < \mathit{fftlen} \end{cases}$$

$$\mathrm{H\_init} = \mathit{fft}(hcir))$$

Herein, mod (a, b) means a mod b;

h1 is the time-domain channel response obtained by circular correlation;

hcir is zero-padded on the basis of h1, to get fftlen's frequency-domain channel response H_init.

h_len is the length of circular correlation, and the lengths of PN420, PN595 and PN945 are 165, 595, and 434 respectively.

corrlen for PN420, PN595 and PN945 are 255, 595, and 512 respectively.

pnlen is the length of PN, and the pnlen for PN420, PN595 and PN945 are 420, 595, and 945 respectively.

gdlen is the length of the guard interval in pn, and the gdlen for PN420, PN595 and PN945 are 165, 0, and 434 respectively.

When the pn code of ck0 is 0, pn [ck0]=1+1i

When the pn code of ck0 is 1, pn [ck0]=−1−1i pnAMP is the amplitude of PN and a known number.

1.2 Frequency-Domain Division

It is known that channel estimation can be obtained by frequency-domain division, through inputting eqin, pn and snr_esti. Specifically: zero-padding pn to the length of fftlen, then do fft, so as to obtain X. The formulas are as follows:

$Y=\mathit{fft}(\mathit{eqin})$ $$Xavg = \sum_{i=0}^{\mathit{fftlen}-1} \mathrm{abs}(X[i])^2$$

-continued $$noisePow = \frac{Xavg}{\mathit{fftlen}} \Big/ \mathrm{snr\_esti}$$

$$cof = \frac{1}{\mathit{fftlen}} * \sum_{i=0}^{\mathit{fftlen}-1} \frac{\mathrm{abs}(X[i])^2}{\mathrm{abs}(X[i])^2 + noisePow}$$

$$\mathrm{H\_init}[i] = \frac{Y[i] * X[i]^*}{(\mathrm{abs}(X[i])^2 + noisePow) * cof} \quad 0 \le i < \mathit{fftlen}$$

Herein, Y is the frequency-domain signal after the input signal eqin's fft conversion, and its length is fftlen.

noisePow is the estimated noise power;

cof is used to correct the energy loss of the entire division, so that acquired H_init is an unbiased MMSE estimation.

H_init is the estimated frequency-domain channel response, and its length is fftlen.

2. The Acquisition of Reference Channel (H_Ref)

This module is implemented after the equalizer, its input is eqin, the output decision value from the equalizer (slicer_out) and the signal-to-noise ratio estimation (snr_esti). The acquisition method of H_ref is similar to the above frequency-domain division, except that pn is replaced by slicer_out. The decision value slicer_out contains the estimation of the transmission sequence and pn. The specific formula are as follows:

$X=\mathit{fft}(\mathrm{slicer\_out})$ $Y=\mathit{fft}(\mathit{eqin})$ $$Xavg = \sum_{i=0}^{\mathit{fftlen}-1} \mathrm{abs}(X[i])^2$$

$$noisePow = \frac{Xavg}{\mathit{fftlen}} \Big/ \mathrm{snr\_esti}$$

$$cof = \frac{1}{\mathit{fftlen}} * \sum_{i=0}^{\mathit{fftlen}-1} \frac{\mathrm{abs}(X[i])^2}{\mathrm{abs}(X[i])^2 + noisePow}$$

$$\mathrm{H\_ref}[i] = \frac{Y[i] * X[i]^*}{(\mathrm{abs}(X[i])^2 + noisePow) * cof} \quad 0 \le i < \mathit{fftlen}$$

Please be noted that this embodiment merely enumerates a method of acquiring H_ref, and other similar algorithms can also be used to acquire H_ref in practice, which does not constitute any limit to the present invention.

3. Acquisition of the Estimation of Better Channel (H_Better)

H_better is another input of the adaptive filter, and H_better can be obtained by filtering H_ref. Herein, H_ref is the frequency-domain response of the channel. Generally speaking, the length of the multipath channel does not exceed the length of the pn sequence pnlen, otherwise it will cause the interference between DATA ISI. Therefore, the noise of H_ref can be filtered, so as to obtain H_better.

Specifically, we can design a filter to achieve this function, and the bandwidth of the designed filter is pnlen; or, through fft transform which is also a filter essentially. Herein, fft transform filter method is as follows:

$h1=\mathit{ifft}(H\_\mathrm{ref})$ $$h2(n) = \begin{cases} h1(n) & n < pnlen \\ 0 & others \end{cases}$$

H_better=fft(h2)

Herein, the lengths of both H_better and h2 are fftlen.

4. Adaptive Filtering

Figure 3:
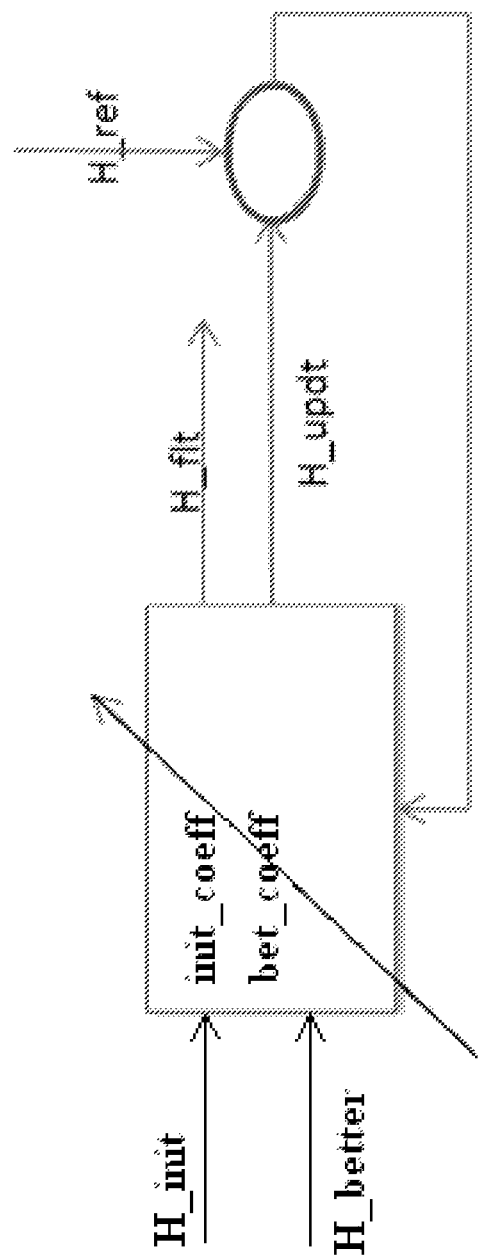
FIG. 3 is a schematic diagram of the adaptive filtering of the present invention.

So far, H_init, H_better and H_ref have been acquired, and the channel estimation H_flt can be obtained by the adaptive filtering. As shown in FIG. 3, H_init and H_better are input signals, H_ref is the reference channel, and the final output signal is generated by adaptive filtering. Adaptive filtering has a variety of ways, such as least mean square (LMS) algorithm, recursive least squares (RLS) algorithm, etc. Take LMS as an example to illustrate it. The usual LMS is divided into two parts, filtering (generating H_updt) and updating coefficients (updating init_coeff and bet_coeff). In the present embodiment, on the basis of said two parts, preferably, a new part can be added, i.e., generation of new data (generating H_flt).

In the following formulas, the array init_idx indicates which Symbols' H_init are used to participate in filtering, and its range of values is not limited; the array bet_idx indicates which Symbols' H_better are used for filtering. Since H_better cannot be generated earlier than H_ref, so the value in bet_idx must be less than 0.

The following six formulas can be used to update the coefficients of all subcarriers i (the range of i is 0<=i<fftlen). In the following formulas, the H_init_array is an array comprising of multiple Symbols' H_init. H_init_array [n, m] means the channel response H_init [m] of the subcarrier m generated by the signal of the $n^{th}$ Symbol. In the same way, it constitutes the corresponding relationship between H_better_array and H_better.

Assuming that the H_better and H_ref of the $n^{th}$ Symbol are obtained after equalizing the Symbol$_n$, and then the coefficient is updated, as follows:

$$H\_updt1[i] = \sum_{init\_idx} init\_coeff[init\_idx] * H\_init\_array[init\_idx + n, i]$$

$$H\_updt2[i] = \sum_{bet\_idx} bet\_coeff[bet\_idx] * H\_better\_array[bet\_idx + n, i]$$

H_updt[i]=H_updt1[i]+H_updt2[i];

err[i]=H_ref[i]−H_updt[i];

Coefficients of all init_coeffs are updated:

init_coeff[init_*idx*]

=init_coeff[init_*idx*]+stepsize*err[i]

*H_init_array[init_*idx*+n,i]*

Coefficients of all bet_coeffs are updated:

bet_coeff[bet_*idx*]

=bet_coeff[bet_*idx*]+stepsize*err[i]

*H_better_array[bet_*idx*+n,i]*

Stepsize is the step length of the coefficient update, which can be transcendentally set according to the need.

After updating the coefficients for all subcarriers, the latest init_coeff and bet_coeff can be used to generate the channel estimation H_flt of the next Symbol$_{n+1}$. The formulas of generating H_flt for subcarrier i are as follows:

$$H\_flt1[i] = \sum_{init\_idx} init\_coeff[init\_idx] * H\_init\_array[init\_idx + n + 1, i]$$

$$H\_flt2[i] = \sum_{bet\_idx} bet\_coeff[bet\_idx] * H\_better\_array[bet\_idx + n + 1, i]$$

H_flt[i]=H_flt1[i]−H_flt2[i]

In view of the above, the present invention provides a single-carrier channel estimation method which obtains the sequence code and the signal-to-noise ratio of the current-frame signal by equalizing the input current-frame signal and the channel estimation, and then obtains the reference channel H_ref and the better channel H_better; through the correlator, the initial channel estimation H_init is obtained; by taking the current H_ref as the reference value, the initial reference channel estimation H_init and the better channel H_better are implemented by the adaptive channel estimation and the coefficient update, so as to obtain the next-frame channel estimation. The technical solution of this invention realizes the calculation of the best channel estimation for any channel environment (whether it is still or moving at different speed), and the performance of the receiver can be improved.

The foregoing is only the preferred embodiments of the invention, not thus limiting embodiments and scope of the invention, those skilled in the art should be able to realize that the schemes obtained from the content of specification and figures of the invention are within the scope of the invention.

The invention claimed is:

1. A single-carrier channel estimation method, comprising:
    equalizing a carrier of an input current-frame signal and of a channel of the current-frame signal, to obtain a sequence code of the current-frame signal, a decision value of a transmission sequence of the current-frame signal and an estimated value of a signal-to-noise ratio of the current-frame signal;
    calculating the current-frame signal, the sequence code and the estimated value of the signal-to-noise ratio to obtain an estimated value of an initial channel;
    calculating the current-frame signal, the decision value of the transmission sequence and the estimated value of the signal-to-noise ratio to obtain a reference channel;
    filtering the reference channel to obtain a filtered channel value; and
    adaptive-filtering the estimated value of the initial channel and the filtered channel value, by taking the reference channel as a reference value, to obtain an estimated channel value of a next-frame signal.

2. The single-carrier channel estimation method according to claim 1, wherein the carrier of the current-frame signal and of the channel of the current-frame signal is equalized by using a single-carrier equalizer.

3. The single-carrier channel estimation method according to claim 1, wherein the estimated value of the initial channel is a frequency response of the channel, which is obtained by calculating the current-frame signal, the sequence code and the estimated value of signal-to-noise ratio through time-domain correlation algorithm or frequency-domain division.

4. The single-carrier channel estimation method according to claim 1, wherein the time-domain correlation algorithm comprises linear correlation algorithm or circular correlation algorithm.

5. The single-carrier channel estimation method according to claim 1, wherein the decision value of the transmission sequence comprises a sequence code and an estimated value of a signal-to-noise ratio.

6. The single-carrier channel estimation method according to claim 1, wherein the reference channel is a frequency response of the channel, the filtered channel value is obtained by filtering the reference channel by a filter, and a bandwidth of the filter equals to a length of the sequence code.

7. The single-carrier channel estimation method according to claim 1, the filtered channel value is obtained by filtering the reference channel by Fourier transform.

8. The single-carrier channel estimation method according to claim 1, wherein the adaptive filtering comprises:

filtering the estimated value of the initial channel and the filtered channel value by taking the reference channel as a reference value, to generate a sub-filter;

updating a coefficient of the sub-filter, so as to generate a latest estimated value of the initial channel and a latest filtered channel value; and calculating the latest estimated value of the initial channel and the latest filtered channel value, to generate the estimated channel value of the next-frame signal.

9. The single-carrier channel estimation method according to claim 1, wherein the current-frame signal is a time-domain signal, and the time-domain signal is a baseband signal, and the baseband signal is converted from a signal being implemented analog-to-digital conversion, then a frequency conversion, a filtering, and a sampling rate conversion; and a rate of the baseband signal is a single symbol rate.

10. The single-carrier channel estimation method according to claim 1, wherein each frame of signal comprises a sequence code and a single-carrier data connected to a tail of the sequence code, and the sequence codes of each frame of signal are identical wherein, so as to form a circle correlation.

\* \* \* \* \*